US008542685B2

(12) United States Patent
Forbes, Jr. et al.

(10) Patent No.: US 8,542,685 B2
(45) Date of Patent: Sep. 24, 2013

(54) SYSTEM AND METHOD FOR PRIORITY DELIVERY OF LOAD MANAGEMENT MESSAGES ON IP-BASED NETWORKS

(75) Inventors: Joseph W. Forbes, Jr., Wake Forest, NC (US); Joel L. Webb, Raleigh, NC (US)

(73) Assignee: Consert, Inc., Raleigh, NC (US)

( * ) Notice: Subject to any disclaimer, the term of this patent is extended or adjusted under 35 U.S.C. 154(b) by 689 days.

(21) Appl. No.: 12/702,554

(22) Filed: Feb. 9, 2010

(65) Prior Publication Data

US 2010/0191862 A1    Jul. 29, 2010

Related U.S. Application Data

(63) Continuation-in-part of application No. 11/895,909, filed on Aug. 28, 2007, now Pat. No. 7,715,951.

(60) Provisional application No. 61/150,949, filed on Feb. 9, 2009, provisional application No. 61/176,976, filed on May 11, 2009.

(51) Int. Cl.
*H04L 12/28* (2006.01)

(52) U.S. Cl.
USPC .............. 370/392; 705/412; 702/60; 702/61; 340/853.2

(58) Field of Classification Search
USPC .................... 370/392, 393, 395.32, 229, 230, 370/232, 233, 235; 709/224, 231–233, 236, 709/238–241; 700/22, 286, 291, 295, 297, 700/60–62; 323/304, 318, 299; 702/60, 702/61, 62, 65; 705/412

See application file for complete search history.

(56) References Cited

U.S. PATENT DOCUMENTS

| 3,906,242 A | 9/1975 | Stevenson |
| 4,023,043 A | 5/1977 | Stevenson |
| 4,589,075 A | 5/1986 | Buennagel |
| 4,799,059 A | 1/1989 | Grindahl et al. |

(Continued)

FOREIGN PATENT DOCUMENTS

| EP | 1729223 | 12/2006 |
| JP | 2000078748 | 3/2000 |

(Continued)

OTHER PUBLICATIONS

PCT/US2010/034395, "International Search Report".

(Continued)

*Primary Examiner* — Kibrom T Hailu
*Assistant Examiner* — Dady Chery
(74) *Attorney, Agent, or Firm* — Womble Carlyle Sandridge & Rice, LLP

(57) ABSTRACT

Methods for prioritizing load management messages on IP-based networks utilizing an Active Load Directory and IP capable two-way gateway. The messages being received from, or sent to, the ISP through the gateway contain a blend of regulated and unregulated data. The regulated data is high-priority utility load management data such as, equipment status and load control instructions. The unregulated data consists of Internet messages such as email and web site data. These methods process all regulatory data before unregulated data within strict time limits, providing the greatest possible load management control and energy savings. The methods emulate dedicated network processor memory in a manner that permits the rules for prioritizing, scheduling, and routing to remain the same across both hardware and software implementations.

39 Claims, 10 Drawing Sheets

(56) References Cited

U.S. PATENT DOCUMENTS

| | | |
|---|---|---|
| 4,819,229 A | 4/1989 | Pritty et al. |
| 5,237,507 A | 8/1993 | Chasek |
| 5,388,101 A | 2/1995 | Dinkins |
| 5,481,546 A | 1/1996 | Dinkins |
| 5,495,239 A | 2/1996 | Ouellette |
| 5,553,094 A | 9/1996 | Johnson et al. |
| 5,570,002 A | 10/1996 | Castleman |
| 5,592,491 A | 1/1997 | Dinkins |
| 5,675,503 A | 10/1997 | Moe et al. |
| 5,682,422 A | 10/1997 | Oliver |
| 5,748,104 A | 5/1998 | Argyroudis et al. |
| 6,018,690 A | 1/2000 | Saito et al. |
| 6,047,274 A | 4/2000 | Johnson et al. |
| 6,078,785 A | 6/2000 | Bush |
| 6,122,603 A | 9/2000 | Budike, Jr. |
| 6,178,362 B1 | 1/2001 | Woolard et al. |
| 6,185,483 B1 | 2/2001 | Drees |
| 6,233,327 B1 | 5/2001 | Petite |
| 6,304,552 B1 | 10/2001 | Chapman et al. |
| 6,519,509 B1 | 2/2003 | Nierlich et al. |
| 6,535,797 B1 | 3/2003 | Bowles et al. |
| 6,601,033 B1 | 7/2003 | Sowinski |
| 6,622,097 B2 | 9/2003 | Hunter |
| 6,633,823 B2 | 10/2003 | Bartone et al. |
| 6,681,154 B2 | 1/2004 | Nierlich et al. |
| 6,687,574 B2 | 2/2004 | Pietrowicz et al. |
| 6,732,055 B2 | 5/2004 | Bagepalli et al. |
| 6,778,882 B2 | 8/2004 | Spool et al. |
| 6,784,807 B2 | 8/2004 | Petite et al. |
| 6,785,592 B1 | 8/2004 | Smith et al. |
| 6,832,135 B2 | 12/2004 | Ying |
| 6,836,737 B2 | 12/2004 | Petite et al. |
| 6,862,498 B2 | 3/2005 | Davis et al. |
| 6,865,450 B2 | 3/2005 | Masticola et al. |
| 6,882,498 B2 | 4/2005 | Kurumatani et al. |
| 6,891,838 B1 | 5/2005 | Petite et al. |
| 6,904,336 B2 | 6/2005 | Raines et al. |
| 6,906,617 B1 | 6/2005 | Van der Meulen |
| 6,909,942 B2 | 6/2005 | Andarawis et al. |
| 6,914,533 B2 | 7/2005 | Petite |
| 6,914,893 B2 | 7/2005 | Petite |
| 6,934,316 B2 | 8/2005 | Cornwall et al. |
| 6,990,593 B2 | 1/2006 | Nakagawa |
| 7,003,640 B2 | 2/2006 | Mayo et al. |
| 7,019,667 B2 | 3/2006 | Petite et al. |
| 7,053,767 B2 | 5/2006 | Petite et al. |
| 7,088,014 B2 | 8/2006 | Nierlich et al. |
| 7,103,511 B2 | 9/2006 | Petite |
| 7,123,994 B2 | 10/2006 | Weik et al. |
| 7,130,719 B2 | 10/2006 | Ehlers et al. |
| 7,133,750 B2 | 11/2006 | Raines et al. |
| 7,181,320 B2 | 2/2007 | Whiffen et al. |
| 7,184,861 B2 | 2/2007 | Petite |
| 7,200,134 B2 | 4/2007 | Proctor, Jr. et al. |
| 7,206,670 B2 | 4/2007 | Pimputkar et al. |
| 7,209,804 B2 | 4/2007 | Curt et al. |
| 7,209,840 B2 | 4/2007 | Petite et al. |
| 7,225,271 B1 * | 5/2007 | DiBiasio et al. ............... 709/240 |
| 7,233,843 B2 | 6/2007 | Budhraja et al. |
| 7,263,073 B2 | 8/2007 | Petite et al. |
| 7,274,975 B2 | 9/2007 | Miller |
| 7,289,887 B2 | 10/2007 | Rodgers |
| 7,295,128 B2 | 11/2007 | Petite |
| 7,305,282 B2 | 12/2007 | Chen |
| 7,313,465 B1 | 12/2007 | O'Donnell |
| 7,343,341 B2 | 3/2008 | Sandor et al. |
| 7,345,998 B2 | 3/2008 | Cregg et al. |
| 7,346,463 B2 | 3/2008 | Petite et al. |
| 7,366,164 B1 | 4/2008 | Habib et al. |
| 7,397,907 B2 | 7/2008 | Petite |
| 7,406,364 B2 | 7/2008 | Andren et al. |
| 7,412,304 B2 | 8/2008 | Uenou |
| 7,424,527 B2 | 9/2008 | Petite |
| 7,440,871 B2 | 10/2008 | McConnell et al. |
| 7,468,661 B2 | 12/2008 | Petite et al. |
| 7,480,501 B2 | 1/2009 | Petite |
| 7,486,681 B2 | 2/2009 | Weber |
| 7,536,240 B2 | 5/2009 | McIntyre et al. |
| 7,541,941 B2 | 6/2009 | Bogolea et al. |
| 7,565,227 B2 | 7/2009 | Richard et al. |
| 7,650,425 B2 | 1/2010 | Davis et al. |
| 7,697,492 B2 | 4/2010 | Petite |
| 7,711,796 B2 | 5/2010 | Gutt et al. |
| 7,715,951 B2 | 5/2010 | Forbes, Jr. et al. |
| 7,738,999 B2 | 6/2010 | Petite |
| 7,739,378 B2 | 6/2010 | Petite |
| 2001/0030468 A1 | 10/2001 | Anderson et al. |
| 2001/0038343 A1 | 11/2001 | Meyer et al. |
| 2002/0019802 A1 | 2/2002 | Malme et al. |
| 2002/0035496 A1 | 3/2002 | Fujushima et al. |
| 2002/0109607 A1 | 8/2002 | Cumeralto et al. |
| 2002/0138176 A1 | 9/2002 | Davis et al. |
| 2002/0143693 A1 | 10/2002 | Soestbergen et al. |
| 2003/0036820 A1 | 2/2003 | Yellepeddy et al. |
| 2003/0083980 A1 | 5/2003 | Satake |
| 2003/0144864 A1 | 7/2003 | Mazzarella |
| 2003/0229572 A1 | 12/2003 | Raines et al. |
| 2004/0006439 A1 | 1/2004 | Hunter |
| 2004/0088083 A1 | 5/2004 | Davis et al. |
| 2004/0095237 A1 * | 5/2004 | Chen et al. ............... 340/506 |
| 2004/0128266 A1 | 7/2004 | Yellepeddy et al. |
| 2004/0158478 A1 | 8/2004 | Zimmerman |
| 2004/0162793 A1 | 8/2004 | Scott et al. |
| 2004/0193329 A1 | 9/2004 | Ransom et al. |
| 2005/0033481 A1 | 2/2005 | Budhraja et al. |
| 2005/0065742 A1 | 3/2005 | Rodgers |
| 2005/0096856 A1 | 5/2005 | Lubkeman et al. |
| 2005/0096857 A1 | 5/2005 | Hunter |
| 2005/0116836 A1 | 6/2005 | Perry et al. |
| 2005/0125243 A1 | 6/2005 | Villalobos |
| 2005/0138432 A1 | 6/2005 | Ransom et al. |
| 2005/0192711 A1 | 9/2005 | Raines et al. |
| 2005/0216302 A1 | 9/2005 | Raji et al. |
| 2005/0216580 A1 | 9/2005 | Raji et al. |
| 2005/0240314 A1 | 10/2005 | Martinez |
| 2005/0240315 A1 | 10/2005 | Booth et al. |
| 2005/0246190 A1 | 11/2005 | Sandor et al. |
| 2005/0267642 A1 | 12/2005 | Whiffen et al. |
| 2005/0276222 A1 | 12/2005 | Kumar et al. |
| 2006/0020544 A1 | 1/2006 | Kaveski |
| 2006/0022841 A1 | 2/2006 | Hoiness et al. |
| 2006/0025891 A1 | 2/2006 | Budike |
| 2006/0031934 A1 | 2/2006 | Kriegel |
| 2006/0106635 A1 | 5/2006 | Ulrich et al. |
| 2006/0161450 A1 | 7/2006 | Carey et al. |
| 2006/0168191 A1 | 7/2006 | Ives |
| 2006/0195334 A1 | 8/2006 | Reeb et al. |
| 2006/0259199 A1 | 11/2006 | Gjerde et al. |
| 2006/0271244 A1 | 11/2006 | Cumming et al. |
| 2006/0271314 A1 | 11/2006 | Hayes |
| 2007/0058629 A1 | 3/2007 | Luft |
| 2007/0070895 A1 | 3/2007 | Narvaez |
| 2007/0085702 A1 | 4/2007 | Walters et al. |
| 2007/0091900 A1 | 4/2007 | Asthana et al. |
| 2007/0100503 A1 | 5/2007 | Balan et al. |
| 2007/0203722 A1 | 8/2007 | Richards et al. |
| 2007/0204176 A1 | 8/2007 | Shaffer et al. |
| 2007/0205915 A1 | 9/2007 | Shuey et al. |
| 2007/0213878 A1 | 9/2007 | Chen |
| 2007/0255457 A1 | 11/2007 | Whitcomb et al. |
| 2007/0286210 A1 | 12/2007 | Gutt et al. |
| 2007/0291644 A1 | 12/2007 | Roberts et al. |
| 2008/0015976 A1 | 1/2008 | Sandor et al. |
| 2008/0091625 A1 | 4/2008 | Kremen |
| 2008/0130673 A1 | 6/2008 | Cregg et al. |
| 2008/0147465 A1 | 6/2008 | Raines et al. |
| 2008/0172312 A1 | 7/2008 | Synesiou et al. |
| 2008/0177678 A1 | 7/2008 | Di Martini |
| 2008/0224892 A1 | 9/2008 | Bogolea et al. |
| 2008/0238710 A1 | 10/2008 | Tolnar et al. |
| 2008/0255899 A1 | 10/2008 | McConnell et al. |
| 2008/0281473 A1 | 11/2008 | Pitt |
| 2009/0018884 A1 | 1/2009 | McConnell et al. |
| 2009/0043519 A1 | 2/2009 | Bridges et al. |

| | | | |
|---|---|---|---|
| 2009/0043520 | A1 | 2/2009 | Pollack et al. |
| 2009/0055031 | A1 | 2/2009 | Slota et al. |
| 2009/0062970 | A1 | 3/2009 | Forbes, Jr. |
| 2009/0063228 | A1 | 3/2009 | Forbes, Jr. |
| 2009/0106571 | A1 | 4/2009 | Low et al. |
| 2009/0112758 | A1 | 4/2009 | Herzig |
| 2009/0135836 | A1 | 5/2009 | Veillette |
| 2009/0187499 | A1 | 7/2009 | Mulder et al. |
| 2009/0240381 | A1 | 9/2009 | Lane |
| 2010/0106575 | A1 | 4/2010 | Bixby et al. |
| 2010/0191862 | A1 | 7/2010 | Forbes, Jr. et al. |
| 2010/0235008 | A1 | 9/2010 | Forbes, Jr. et al. |
| 2011/0022239 | A1 | 1/2011 | Forbes, Jr. |
| 2011/0029655 | A1 | 2/2011 | Forbes, Jr. |
| 2011/0125422 | A1 | 5/2011 | Goncalves Jota et al. |
| 2011/0231320 | A1 | 9/2011 | Irving |
| 2011/0251807 | A1 | 10/2011 | Rada et al. |

FOREIGN PATENT DOCUMENTS

| | | |
|---|---|---|
| JP | 2001306839 | 11/2001 |
| JP | 2004248174 | 2/2004 |
| JP | 2004180412 | 6/2004 |
| JP | 2006060911 | 3/2006 |
| KR | 2005001584 | 1/2005 |
| KR | 2005-0045272 | 5/2005 |
| KR | 2007-0008321 | 1/2007 |
| WO | WO 2008125696 | 10/2008 |
| WO | WO 2009032161 | 3/2009 |
| WO | WO 2009032162 | 3/2009 |
| WO | WO 2010129059 | 11/2010 |
| WO | WO 2010129958 | 11/2010 |
| WO | WO 2010132456 | 11/2010 |
| WO | WO 2010132469 | 11/2010 |
| WO | WO 2010132477 | 11/2010 |
| WO | WO 2010134987 | 11/2010 |
| WO | WO 2011043818 | 4/2011 |
| WO | WO 2011046589 | 4/2011 |

OTHER PUBLICATIONS

PCT/US2010/034395, "Written Opinion of the International Searching Authority".

Inoue, et al. Network Architecture for Home Energy Management System, IEEE Transactions on Consumer Electronics, vol. 49, Issue 3, Aug. 2003, pp. 606-613 (8 pages).

Paul Darbee, INSTEON The Details, Smarthouse, Inc., Aug. 11, 2005, 68 pages.

Paul Darbee, INSTEON Compared, SmartLabs, Inc., Jan. 2, 2006, 69 pages.

Allowing for Household Preferences in Emission Trading, A Contribution to the Climate Policy Debate, Michael Ahlheim and Friedrich Schneider, Environmental and Resource Economics 21: 317-342, 2002 Kluwer Academic Publishers, Printed in the Netherlands (26 pages).

Environmental and economic benefits resulting from citizens' participation in CO2 emissions trading: An efficient alternative solution to the voluntary compensation of CO2 emissions, Olivier Rousse, Energy Policy 36 (2008) 388-397 (10 pages).

B.J. Kirby, Spinning Reserve from Responsive Loads, Oak Ridge National Laboratory, United States Dept. of Energy, Mar. 2003 (54 pages).

Eric Hirst and Brendan Kirby, Opportunities for Demand Participation in New England Contingency-Reserve Markets, New England Demand Response Initiative, Feb. 2003 (15 pages).

Pablo A. Ruiz and Peter W. Sauer, Valuation of Reserve Services, IEEE Proceedings of the $41^{st}$ Hawaii International Conference on System Sciences, 2008 (9 pages).

Eric Hirst and Richard Cowart, Demand Side Resources and Reliability, New England Demand Response Initiative, Mar. 20, 2002 (32 pages).

C.W. Gellings and W.M. Smith, Integrating Demand-Side Management into Utility Planning, Proceedings of the IEEE, vol. 77, Issue: 6, Jun. 1989, pp. 908-918 (Abstract only).

M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).

L.T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).

Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).

Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).

* cited by examiner

SYSTEM AND METHOD FOR PRIORITY DELIVERY OF LOAD MANAGEMENT MESSAGES ON IP-BASED NETWORKS

CROSS-REFERENCE TO RELATED APPLICATIONS

This application is a continuation-in-part of U.S. patent application Ser. No. 11/895,909, filed on Aug. 28, 2007. This application claims the benefit of provisional patent application Ser. No. 61/150,949, filed on Feb. 9, 2009, and provisional patent application Ser. No. 61/176,976, filed on May 11, 2009. The specification and drawings of the provisional patent applications are specifically incorporated by reference herein. This application is also related to commonly-owned U.S. patent application Ser. No. 12/001,819, filed on Dec. 13, 2007.

BACKGROUND OF THE INVENTION

1. Field of the Invention

The present disclosure relates generally to electrical power load control systems and, more particularly, to prioritizing incoming and outgoing load management messages received at a gateway of the system, to ensure that all regulated load management messages are processed before general Internet Protocol (IP) traffic.

2. Description of Related Art

The separation of message traffic into different types of data is a well-known and well-understood practice. This is practiced in a variety of systems today.

Dial-up access is available to customers, but is considerably slower than broadband access. For many rural customers, this prohibits use of some Internet services, such as automatic updates of software.

Currently, rural customers lack inexpensive options for broadband Internet access. Most Internet Service Providers (ISPs) question the business value of providing broadband service in rural areas. There seems to be little profit from providing service when installation costs are high and the small number of potential customers would make it difficult for an ISP to recoup those costs. Phone companies provide Internet access through digital subscriber line (DSL) technology, but customers must be within a few miles of a central office. This eliminates many rural customers from Internet access via DSL.

The most commonly-used option for rural customers is provided through satellite Internet service providers. However, there are a number of disadvantages to customers associated with these providers, including high latency, unreliability, and fair access policy. High latency is a particular problem for those customers needing high interactivity, such as online gamers. Unreliability can be attributed to bad weather and sunspots that can cause interruption in service. If a service provider uses a fair access policy, a heavy user may see service degradation after considerable traffic.

One of the most cost effective options that has emerged is the utilization of advanced wireless communications standards to reach rural customers. Traditional or new wireless mobile operators (WMOs) offer a logical alternative to the installation of a physical link for high speed broadband Internet access. These providers operate a conventional point to point Internet connection, such as cable or T1 service, but also make that connection available wirelessly to customers using technology such as High Speed Data Packet Access (HSDPA), Code Division Multiple Access EVDO Revision A (CDMA Rev. A), Long Term Evolution (LTE), or IEEE 802.16 WiMax.

Independently owned Wireless Internet Service Providers (WISPs) are small operations run by local providers out of necessity in markets where WMOs have not yet provisioned advanced wireless services. These WISPs emerged simply because of the need for broadband access and are not focused on profit. These local providers may include municipal WISPS, "mom and pop" WISPS, and nonprofits. Most of these smaller wireless providers operate and deliver services in unlicensed industrial, scientific, and medical (ISM) radio bands and utilize IEEE 802.11(a-n) delivery mechanisms. Even when a WISP exists in an area, customers may not take advantage of the service because of the additional work that may be required on the part of the customer to gain access.

SUMMARY OF THE INVENTION

The embodiments described herein use IP-based communications between a service point and a power utility, either through the provisioning of the last mile as described above, or with utility owned and operated networks.

Embodiments described herein prioritize incoming and outgoing load management messages received at the Active Load Client (ALC) to ensure that all regulated load management messages are processed before general IP traffic. In one embodiment, a method is provided for prioritizing load management messages on IP-based networks utilizing an Active Load Director (ALD) and IP capable two-way gateway. The messages being received from, or sent to, the ISP through the gateway contain a blend of regulated and unregulated data. The regulated data is high-priority utility load management data such as equipment status and load control instructions. The unregulated data consists of Internet messages such as email and web site data. The method processes all regulatory data before unregulated data within strict time limits, providing the greatest possible load management control and energy savings. The method emulates dedicated network processor memory in a manner that permits the rules for prioritizing, scheduling, and routing to remain the same across both hardware and software implementations.

In one embodiment, a method is provided for priority delivery of messages on a communications network between a server in communication with an electric utility and a client device at a service point. A plurality of regulated data messages and a plurality of unregulated data messages are received at a bidirectional gateway in the client device. The plurality of regulated data messages and plurality of unregulated data messages are separated at the bidirectional gateway into a plurality of data queues based on a priority assigned to each type of data message. The plurality of regulated data messages at the bidirectional gateway are processed in a plurality of regulated data queues and routed to a regulated data message destination device. The plurality of unregulated data messages at the bidirectional gateway are processed in a plurality of unregulated data queues and routed to an unregulated data message destination device following the routing of all messages in the plurality of regulated data queues.

In one embodiment, a system is provided for priority delivery of messages on a communications network between a server in communication with an electric utility and a plurality of Internet Protocol (IP) connected devices at a service point. The system includes a network interface component having a plurality of data queues arranged based on a priority associated with each type of data message; and a processor configured for priority delivery of data messages by: receiving a plurality of regulated data messages and a plurality of unregulated data messages; separating the plurality of regulated data messages and plurality of unregulated data messages at the bidirectional gateway into the plurality of data queues based on the priority associated with each type of data message; processing the plurality of regulated data messages at the bidirectional gateway in a plurality of regulated data queues and routing the plurality of regulated data messages to a regulated data message destination device; and processing the plurality of unregulated data messages at the bidirectional gateway in a plurality of unregulated data queues and routing the plurality of unregulated data messages to an unregulated data message destination device following the routing of all messages in the plurality of regulated data queues.

BRIEF DESCRIPTION OF THE DRAWINGS

These and other advantages and aspects of the embodiments of the invention will become apparent and more readily appreciated from the following detailed description of the embodiments taken in conjunction with the accompanying drawings, as follows.

DETAILED DESCRIPTION

Figure 1:
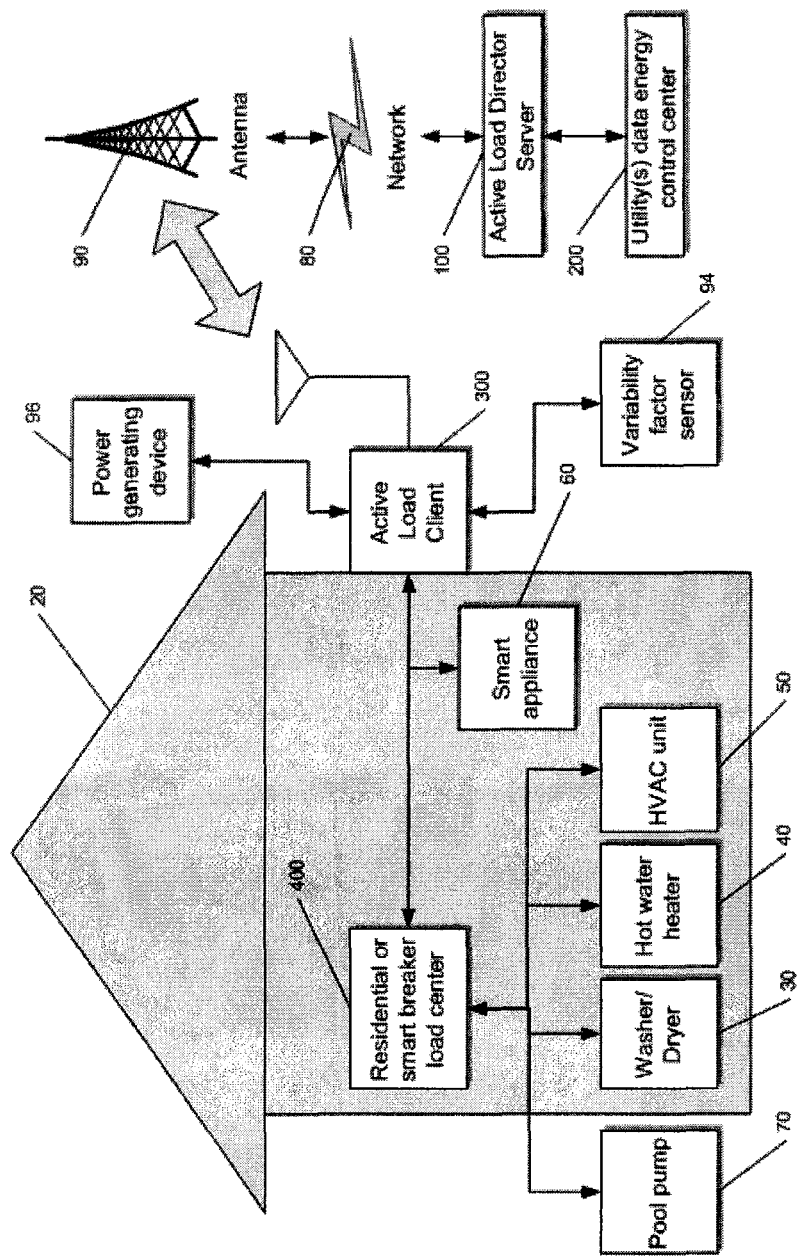
FIG. 1 is a block diagram of an exemplary IP-based, active power load management system (ALMS).

Before describing exemplary embodiments in detail, it should be observed that the embodiments described reside primarily in combinations of apparatus components and processing steps related to actively managing power loading on an individual subscriber basis, ensuring that regulated data, such as load control commands (messages), are processed with the highest priority, and optionally tracking power savings incurred by both individual subscribers and an electric utility. Accordingly, the apparatus components and method steps have been represented where appropriate by conventional symbols in the drawings, showing only those specific details that are pertinent to understanding the embodiments disclosed so as not to obscure the disclosure with details that will be readily apparent to those of ordinary skill in the art having the benefit of the description herein.

The term "electric utility" as used herein refers to any entity that generates and distributes electrical power to its customers, that purchases power from a power-generating entity and distributes the purchased power to its customers, or that supplies electricity created by alternative energy sources, such as solar power, wind power or otherwise, to power generation or distribution entities through the Federal Energy Regulatory Commission (FERC) electrical grid or otherwise.

The embodiments described utilize concepts disclosed in commonly-owned published patent application US 2009/0062970, entitled "System and Method for Active Power Load Management" which is incorporated by reference in its entirety herein. More particularly, the embodiments described use the Active Load Management System (ALMS) disclosed in US 2009/0062970 that allows customers to access the Internet through the communications components of the ALMS. This makes Internet access available to customers who did not formerly have Internet access, especially rural customers. The following paragraphs describe the Active Management Load System (ALMS), Active Load Director (ALD), and Active Load Client (ALC) in sufficient detail to assist the reader in the understanding of the embodiments described herein. More detailed description of the ALMS, ALD, and ALC can be found in US 2009/0062970.

Active Load Management System

FIG. 1 depicts an exemplary IP-based Active Load Management System (ALMS) 10 that may be utilized by a utility in the embodiments described herein. The exemplary ALMS 10 monitors and manages power distribution via an active load director (ALD) 100 connected between one or more utility control centers (UCCs) 200 and one or more Active Load Clients (ALCs) 300. The ALD 100 may communicate with the utility control center 200 and each active load client 300 either directly or through a network 80 using the Internet Protocol (IP) or any other connection-based protocols. For example, the ALD 100 may communicate using RF systems operating via one or more base stations 90 using one or more well-known wireless communication protocols. Alternatively, or additionally, the ALD 100 may communicate via a digital subscriber line (DSL) capable connection, cable television based IP capable connection, or any combination thereof. In the exemplary embodiment shown in FIG. 1, the ALD 100 communicates with one or more active load clients 300 using a combination of traditional IP-based communication (e.g., over a trunked line) to a base station 90 and a wireless channel implementing the WiMax protocol for the "last mile" from the base station 90 to the active load client 300.

Each ALC 300 is accessible through a specified address (e.g., IP address) and controls and monitors the state of individual smart breaker modules or intelligent appliances 60 installed in the business or residence 20 to which the ALC 300 is associated (e.g., connected or supporting). Each ALC 300 is associated with a single residential or commercial customer. In one embodiment, the ALC 300 communicates with a residential load center 400 that contains smart breaker modules, which are able to switch from an "ON" (active) state to an "OFF" (inactive) state, and vice versa, responsive to signaling from the ALC 300. Typically, each smart breaker controls a single appliance (e.g., a washer/dryer 30, a hot water heater 40, an HVAC unit 50, or a pool pump 70).

Additionally, the ALC 300 may control individual smart appliances directly (e.g., without communicating with the residential load center 400) via one or more of a variety of known communication protocols (e.g., IP, Broadband over Power Line (BPL) in various forms, including through specifications promulgated or being developed by the HOME- PLUG Powerline Alliance and the Institute of Electrical and Electronics Engineers (IEEE), Ethernet, Bluetooth, ZigBee, Wi-Fi, WiMax, etc.). Typically, a smart appliance 60 includes a power control module (not shown) having communication abilities. The power control module is installed in-line with the power supply to the appliance, between the actual appliance and the power source (e.g., the power control module is plugged into a power outlet at the home or business and the power cord for the appliance is plugged into the power control module). Thus, when the power control module receives a command to turn off the appliance 60, it disconnects the actual power supplying the appliance 60. Alternatively, a smart appliance 60 may include a power control module integrated directly into the appliance, which may receive commands and control the operation of the appliance directly (e.g., a smart thermostat may perform such functions as raising or lowering the set temperature, switching an HVAC unit on or off, or switching a fan on or off).

Also as shown in FIG. 1, a service point 20 may have its own power generation on-site, including solar panels, fuel cells, or wind turbines. This is indicated by the power generating device 96. The power generating device 96 connects to the Active Load Client 300. Power that is added by the power generating device 96 is added to the overall utility capacity. The utility provides credit to the service point owner based on the energy produced at the service point.

The service point 20 also contains the Customer Dashboard 98. This is a web-based interface used by the customer to specify preferences for the use of the Active Load Management System at the customer's service point. These preferences include control event preferences, bill management preferences, and others.

Active Load Director

Figure 2:
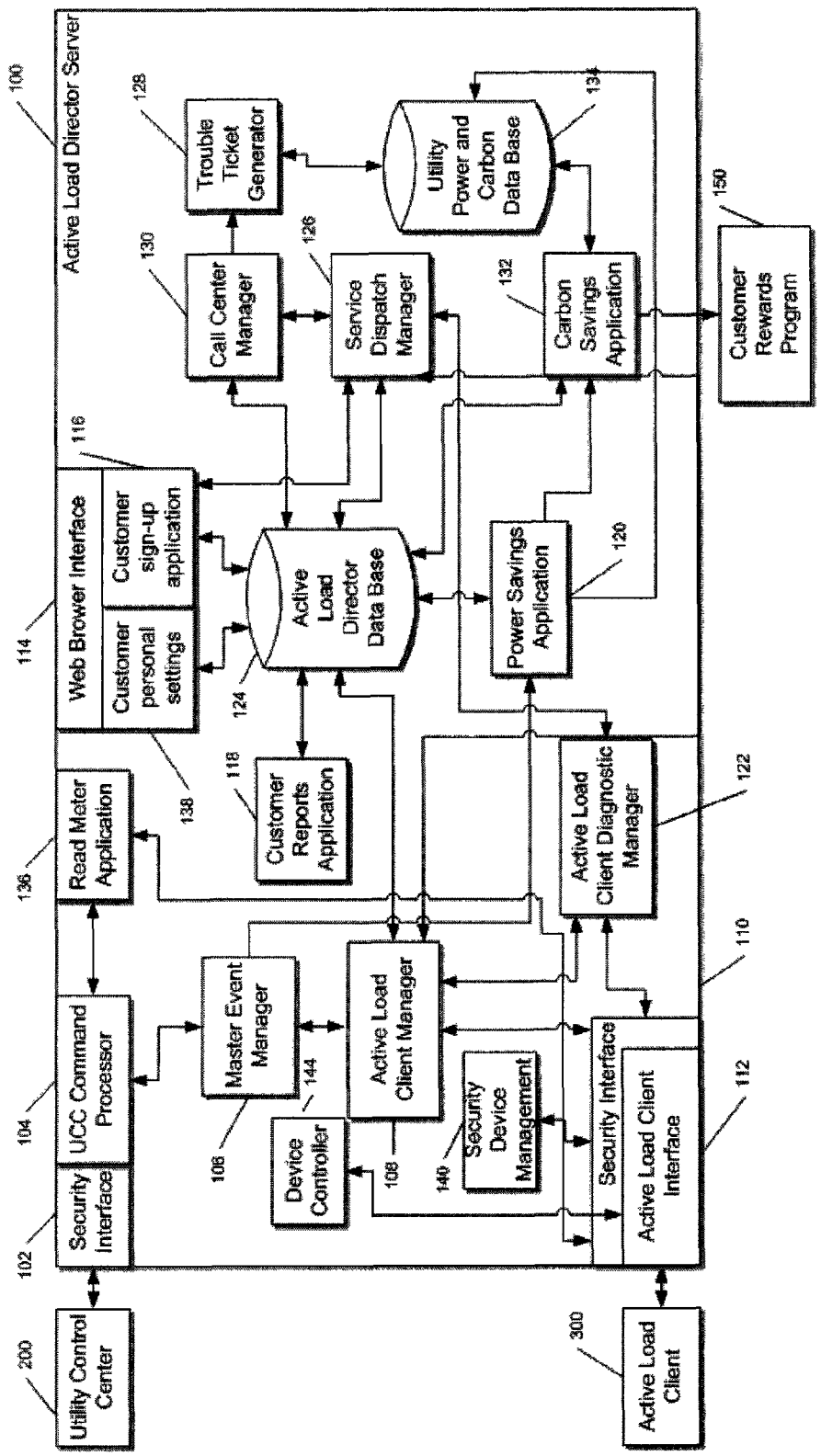
FIG. 2 is a block diagram illustrating an exemplary Active Load Director (ALD) server included in the power load management system.

Referring now to FIG. 2, the ALD 100 may serve as the primary interface to customers, as well as to service personnel. In the exemplary embodiment depicted in FIG. 2, the ALD 100 includes a utility control center (UCC) security interface 102, a UCC command processor 104, a master event manager 106, an ALC manager 108, an ALC security interface 110, an ALC interface 112, a web browser interface 114, a customer sign-up application 116, customer personal settings 138, a customer reports application 118, a power savings application 120, an ALC diagnostic manager 122, an ALD database 124, a service dispatch manager 126, a trouble ticket generator 128, a call center manager 130, a carbon savings application 132, a utility power and carbon database 134, a read meter application 136, and a security device manager 140.

In one embodiment, customers interact with the ALD 100 using the web browser interface 114, and subscribe to some or all of the services offered by the power load management system 10 via a customer sign-up application 116. In accordance with the customer sign-up application 116, the customer specifies customer personal settings 138 that contain information relating to the customer and the customer's residence or business, and defines the extent of service to which the customer wishes to subscribe. Customers may also use the web browser interface 114 to access and modify information pertaining to their existing accounts.

The ALD 100 also includes a UCC security interface 102 which provides security and encryption between the ALD 100 and a utility company's control center 200 to ensure that no third party is able to provide unauthorized directions to the ALD 100. A UCC command processor 104 receives and sends messages between the ALD 100 and the utility control center 200. Similarly, an ALC security interface 110 provides security and encryption between the ALD 100 and each ALC 300 on the system 10, ensuring that no third parties can send directions to, or receive information from, the ALC 300. The security techniques employed by the ALC security interface 110 and the UCC security interface 102 may include conventional symmetric key or asymmetric key algorithms, or proprietary encryption techniques.

The master event manager 106 maintains the overall status of the power load activities controlled by the power management system 10. The master event manager 106 maintains a separate state for each utility that is controlled and tracks the current power usage within each utility. The master event manager 106 also tracks the management condition of each utility (e.g., whether or not each utility is currently being managed). The master event manager 106 receives instructions in the form of transaction requests from the UCC command processor 104 and routes instructions to components necessary to complete the requested transaction, such as the ALC manager 108 and the power savings application 120.

The ALC manager 108 routes instructions between the ALD 100 and each ALC 300 within the system 10 through an ALC interface 112. For instance, the ALC manager 108 tracks the state of every ALC 300 serviced by specified utilities by communicating with the ALC 300 through an individual IP address. The ALC interface 112 translates instructions (e.g., transactions) received from the ALC manager 108 into the proper message structure understood by the targeted ALC 300 and then sends the message to the ALC 300. Likewise, when the ALC interface 112 receives messages from an ALC 300, it translates the message into a form understood by the ALC manager 108 and routes the translated message to the ALC manager 108.

The ALC manager 108 receives from each ALC 300 that it services, either periodically or responsive to polling messages sent by the ALC manager 108, messages containing the present power consumption and the status (e.g., "ON" or "OFF") of each device controlled by the ALC 300. Alternatively, if individual device metering is not available, then the total power consumption and load management status for the entire ALC 300 may be reported. The information contained in each status message is stored in the ALD database 124 in a record associated with the specified ALC 300. The ALD database 124 contains all the information necessary to manage every customer account and power distribution. In one embodiment, the ALD database 124 contains customer contact information and associated utility companies for all customers having ALCs 300 installed at their residences or businesses, as well as a description of specific operating instructions for each managed device (e.g., IP-addressable smart breaker or appliance), device status, and device diagnostic history.

Another message that can be exchanged between an ALC 300 and the ALC manager 108 is a status response message. A status response message reports the type and status of each device controlled by the ALC 300 to the ALD 100. When a status response message is received from an ALC 300, the ALC manager 108 logs the information contained in the message in the ALD database 124.

In one embodiment, upon receiving instructions (e.g., a "Cut" instruction) from the master event manager 106 to reduce power consumption for a specified utility, the ALC manager 108 determines which ALCs 300 and/or individually controlled devices to switch to the "OFF" state based upon present power consumption data stored in the ALD database 124. The ALC manager 108 then sends a message to each selected ALC 300 containing instructions to turn off all or some of the devices under the ALC's control.

A read meter application 136 may be optionally invoked when the UCC command processor 104 receives a "Read Meters" or equivalent command from the utility control center 200. The read meter application 136 cycles through the ALD database 124 and sends a read meter message or command to each ALC 300, or to ALCs 300 specifically identified in the UCC's command, via the ALC manager 108. The information received by the ALC manager 108 from the ALC 300 is logged in the ALD database 124 for each customer. When all the ALC meter information has been received, the information is sent to the requesting utility control center 200 using a business to business (e.g., ebXML) or other desired protocol.

Active Load Client

Figure 3:
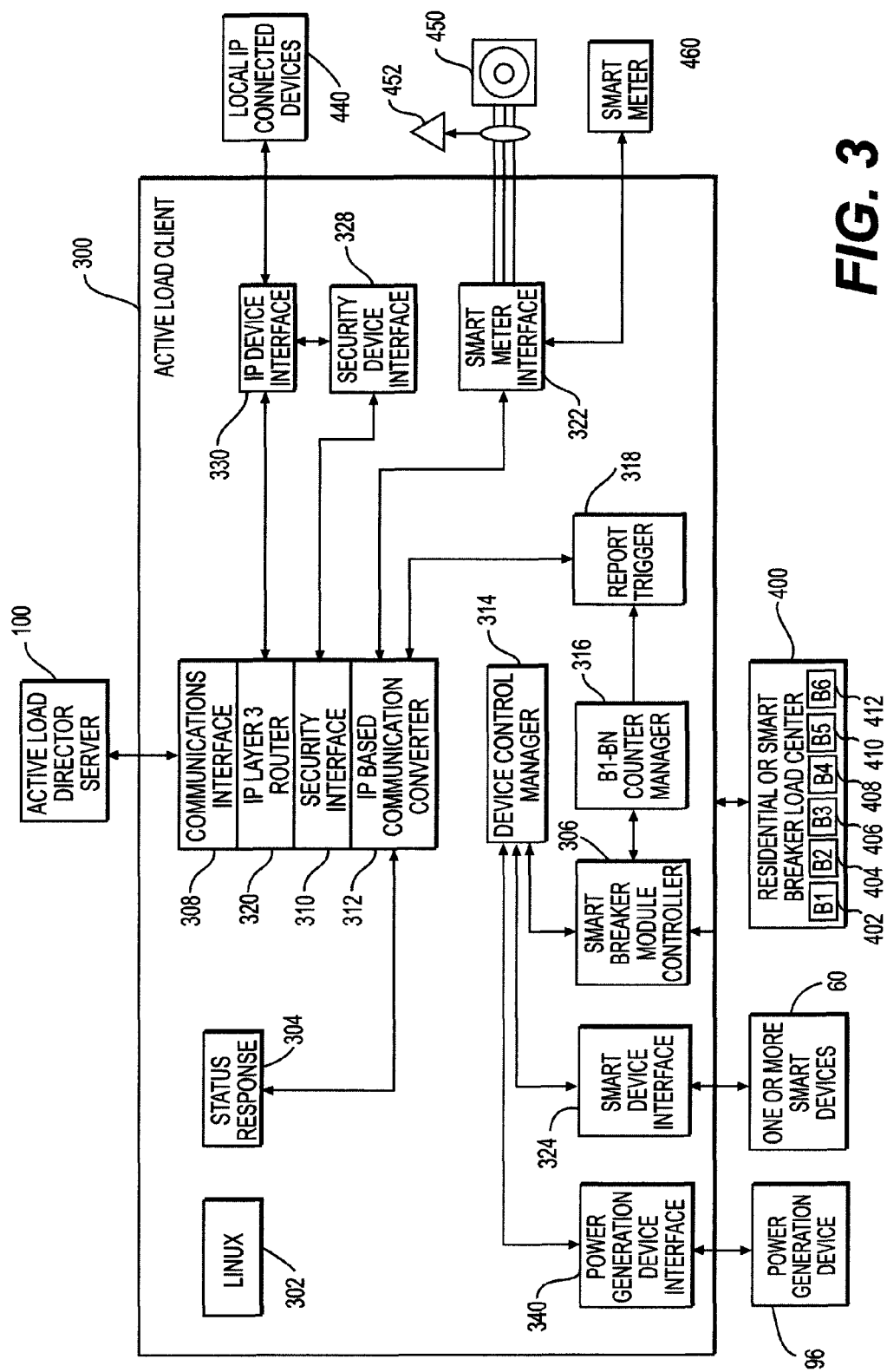
FIG. 3 is a block diagram illustrating an exemplary Active Load Client (ALC) and smart breaker module included in the power load management system.

FIG. 3 illustrates a block diagram of an exemplary active load client 300 in accordance with one embodiment of the present invention. The depicted active load client 300 includes a smart breaker module controller 306, a communications interface 308, a security interface 310, an IP-based communication converter 312, a device control manager 314, a smart breaker (B1-BN) counter manager 316, an IP router 320, a smart meter interface 322, a smart device interface 324, an IP device interface 330, and a power dispatch device interface 340. The active load client 300, in this embodiment, is a computer or processor-based system located on-site at a customer's residence or business. The primary function of the active load client 300 is to manage the power load levels of controllable, power consuming load devices located at the residence or business, which the active load client 300 oversees on behalf of the customer. In an exemplary embodiment, the active load client 300 may include dynamic host configuration protocol (DHCP) client functionality to enable the active load client 300 to dynamically request IP addresses for itself and/or one or more controllable devices 402-412, 60 managed thereby from a DHCP server on the host IP network facilitating communications between the active load client 300 and the ALD 100. The active load client 300 may further include router functionality and maintain a routing table of assigned IP addresses in a memory of the active load client 300 to facilitate delivery of messages from the active load client 300 to the controllable devices 402-412, 60. Finally, the power generation device 96 at the service point 20 sends data about power generated to the power dispatch device interface 340.

A communications interface 308 facilitates connectivity between the active load client 300 and the ALD server 100. Communication between the active load client 300 and the ALD server 100 may be based on any type of IP or other connection protocol including, but not limited to, the WiMax protocol. Thus, the communications interface 308 may be a wired or wireless modem, a wireless access point, or other appropriate interface.

A standard IP Layer-3 router 320 routes messages received by the communications interface 308 to both the active load client 300 and to any other locally connected device 440. The router 320 determines if a received message is directed to the active load client 300 and, if so, passes the message to a security interface 310 to be decrypted. The security interface 310 provides protection for the contents of the messages exchanged between the ALD server 100 and the active load client 300. The message content is encrypted and decrypted by the security interface 310 using, for example, a symmetric encryption key composed of a combination of the IP address and GPS data for the active load client 300 or any other combination of known information. If the message is not directed to the active load client 300, then it is passed to the IP device interface 330 for delivery to one or more locally connected devices 440. For example, the IP router 320 may be programmed to route power load management system messages as well as conventional Internet messages. In such a case, the active load client 300 may function as a gateway for Internet service supplied to the residence or business instead of using separate Internet gateways or routers.

An IP based communication converter 312 opens incoming messages from the ALD server 100 and directs them to the appropriate function within the active load client 300. The converter 312 also receives messages from various active load client 300 functions (e.g., a device control manager 314, a status response generator 304, and a report trigger application 318), packages the messages in the form expected by the ALD server 100, and then passes them on to the security interface 310 for encryption.

The device control manager 314 processes power management commands for various controllable devices logically connected to the active load client 300. The devices can be either smart breakers 402-412 or other IP based devices 60, 460, such as smart appliances with individual control modules (not shown). The device control manager 314 also processes "Query Request" or equivalent commands or messages from the ALD server 100 by querying a status response generator 304 which maintains the type and status of each device controlled by the active load client 300, and providing the status of each device to the ALD server 100.

The status response generator 304 receives status messages from the ALD server 100 and, responsive thereto, polls each controllable device 402-412, 60, 460 under the active load client's control to determine whether the controllable device 402-412, 60, 460 is active and in good operational order. Each controllable device 402-412, 60, 460 responds to the polls with operational information (e.g., activity status and/or error reports) in a status response message. The active load client 300 stores the status responses in a memory associated with the status response generator 304 for reference in connection with power reduction events.

The smart device interface 324 facilitates IP or other address-based communications to individual devices 60 (e.g., smart appliance power control modules) that are attached to the active load client 300. The connectivity can be through one of several different types of networks including, but not limited to, BPL, ZigBee, Wi-Fi, Bluetooth, or direct Ethernet communications. Thus, the smart device interface 324 is a modem adapted for use in or on the network connecting the smart devices 60 to the active load client 300.

The smart breaker module controller 306 formats, sends, and receives messages to and from the smart breaker module 400. In one embodiment, the communications is preferably through a BPL connection. In such embodiment, the smart breaker module controller 306 includes a BPL modem and operations software. The smart breaker module 400 contains individual smart breakers 402-412, wherein each smart breaker 402-412 includes an applicable modem (e.g., a BPL modem when BPL is the networking technology employed) and is preferably in-line with power supplied to a single appliance or other device. The B1-BN counter manager 316 determines and stores real time power usage for each installed smart breaker 402-412. For example, the counter manager 316 tracks or counts the amount of power used by each smart breaker 402-412 and stores the counted amounts of power in a memory of the active load client 300 associated with the counter manager 316.

The smart meter interface 322 manages either smart meters 460 that communicate using BPL or a current sensor 452 connected to a traditional power meter 450. When the active load client 300 receives a "Read Meters" command or message from the ALD server 100 and a smart meter 460 is attached to the active load client 300, a "Read Meters" command is sent to the meter 460 via the smart meter interface 322 (e.g., a BPL modem). The smart meter interface 322 receives a reply to the "Read Meters" message from the smart meter 460, formats this information along with identification information for the active load client 300, and provides the formatted message to the IP based communication converter 312 for transmission to the ALD server 100.

The following description of exemplary embodiments encompass methods and apparatus for prioritizing load management traffic on IP-based networks utilizing an Active Load Director (ALD) and IP-capable two-way gateway. The embodiments include a method for determining and handling regulatory data with higher priority than unregulated data. The methods disclosed expand upon conventional data processing/handling algorithms/techniques, by applying them to the processing of unique load management control and informational data in an environment that is highly dependent on priority handling of all regulated data.

If the communications can be filtered so that only regulated data (e.g., utility data including meter readings) is sent to the power utility, and unregulated data is sent to a WMO or WISP, then the ALMS could be used to provide a means for Internet communication between the customer and a WISP. Without this technology, it would be difficult to utilize ALMS for the dual purpose of the transmission of data for load management, advanced metering infrastructure (AMI), power quality information, or any other power/utility related operational metric without the implementation of rate base allocation. Furthermore, the use of rate payer assets for the transmittal of "for profit" content without such rate base allocation is in conflict with general public utility commission policies in the United States. To insure the separation of costs for rate based equipment, regulated data must be given priority over unregulated data. Thus, the Active Load Client (ALC) as described in US 2009/0062970 would enable customers (especially rural customers) to have broadband access to the Internet. In one embodiment, the Active Load Client could be included within the utility power meter as an integrated board or electronics that are manufactured as an integrated portion of the meter.

Regulated data is used in communication between the devices and Active Load Client at the service point and the Active Load Director. There are two types of regulated data: regulated control data and regulated administrative data. Regulated control data is used to carry out control events within devices at a service point, whereas regulated administrative data is used in the monitoring and status reporting of devices within the service point. Unregulated data includes data from customer-initiated Internet applications (including email, instant messaging, and web pages), and non-ALMS systems, such as security systems or voice over IP (VoIP) systems. When using Internet Protocol Version 6 (IPv6), regulated traffic is indicated by setting the priority bit in the message header, whereas unregulated traffic is indicated by not setting the priority bit in the header.

The embodiments disclosed cover the prioritization of regulated and unregulated data, as well as other types of data that may be used within the Active Load Management System. In all cases, the prioritization of data will be such that regulated control data has highest priority and regulated administrative data has second highest priority.

The regulated data in question is blended with unregulated data in IPv4/v6 traffic flowing between an ISP and an individual customer's Active Load Client. Regulated data includes mission-critical data, such as equipment status and load control instructions, that must be processed at the customer end or transmitted to the Active Load Director and/or power utility within specific time constraints. Regulated data can be subdivided into high priority control data and administrative data. The unregulated data includes email messages and other general Internet traffic.

The embodiments described herein meet or exceed the requirement that all regulatory data is processed before unregulated data. The regulated data is processed within strict time constraints, providing extremely efficient and timely load management control and energy savings. The described methods emulate dedicated network processor memory in a manner that permits the rules for prioritizing, scheduling, and routing to remain the same across both hardware and software implementations.

Figure 4:
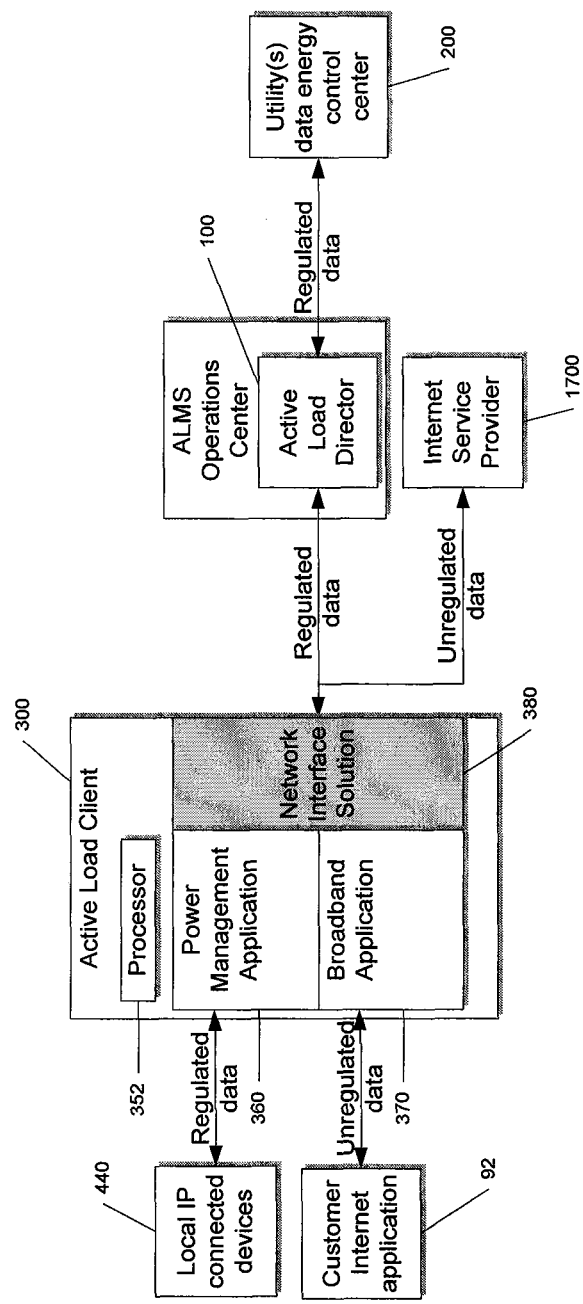
FIG. 4 is a high-level block diagram illustrating the use of an exemplary IP-based, active power load management system to provide priority delivery of regulated data.

The disclosed embodiments can be more readily understood with reference to FIGS. 4-10, in which like reference numerals designate like items. FIG. 4 is a high-level view illustrating how regulated and unregulated data flows through the Active Load Client (ALC) 300. All regulated data flows between the Power Management Application 360 in the ALC 300 and the local IP connected devices 440. All unregulated data flows between the broadband application 370 in the ALC 300 and the customer Internet application 92.

In an exemplary embodiment, the ALC 300 is situated at the customer's service point. Data related to the control and administration of devices within the service point (i.e., regulated data) passes from each device to the Power Management Application 360 within the ALC 300. Regulated data is then transferred to a queue in the Network Interface Solution 380. The Network Interface Solution 380 separates the regulated data from the unregulated data and directs the regulated data to the Active Load Director 100 and power utility control center 200. Regulated data flows back from the ALD 100 to the service point in a similar fashion, passing through the Network Interface Solution 380 and the Power Management Application 360 to the devices 440 at the service point.

Unregulated data (i.e., email and other customer-initiated Internet data) passes from the customer's Internet application 92 to the broadband application 370 within the ALC 300. This data goes into an unregulated data queue with regulated data as part of the Network Interface Solution 380 which separates the data into regulated and unregulated data. The unregulated data passes to the customer's Internet Service Provider 1700.

The Network Interface Solution 380 encompasses any of several approaches described herein that separates regulated data from unregulated data going into and out of the Active Load Client 300. Four of these approaches are illustrated in FIGS. 5-8. Each approach processes data packets based on priority, with regulated data being processed before unregulated data. The data processing priority is as follows: (1) regulated control data has highest priority, (2) regulated administrative data has second highest priority, and (3) unregulated data has lowest priority. Each approach uses first-in, first-out (FIFO) buffers, with the data packets being processed based on content priority.

Figure 5:
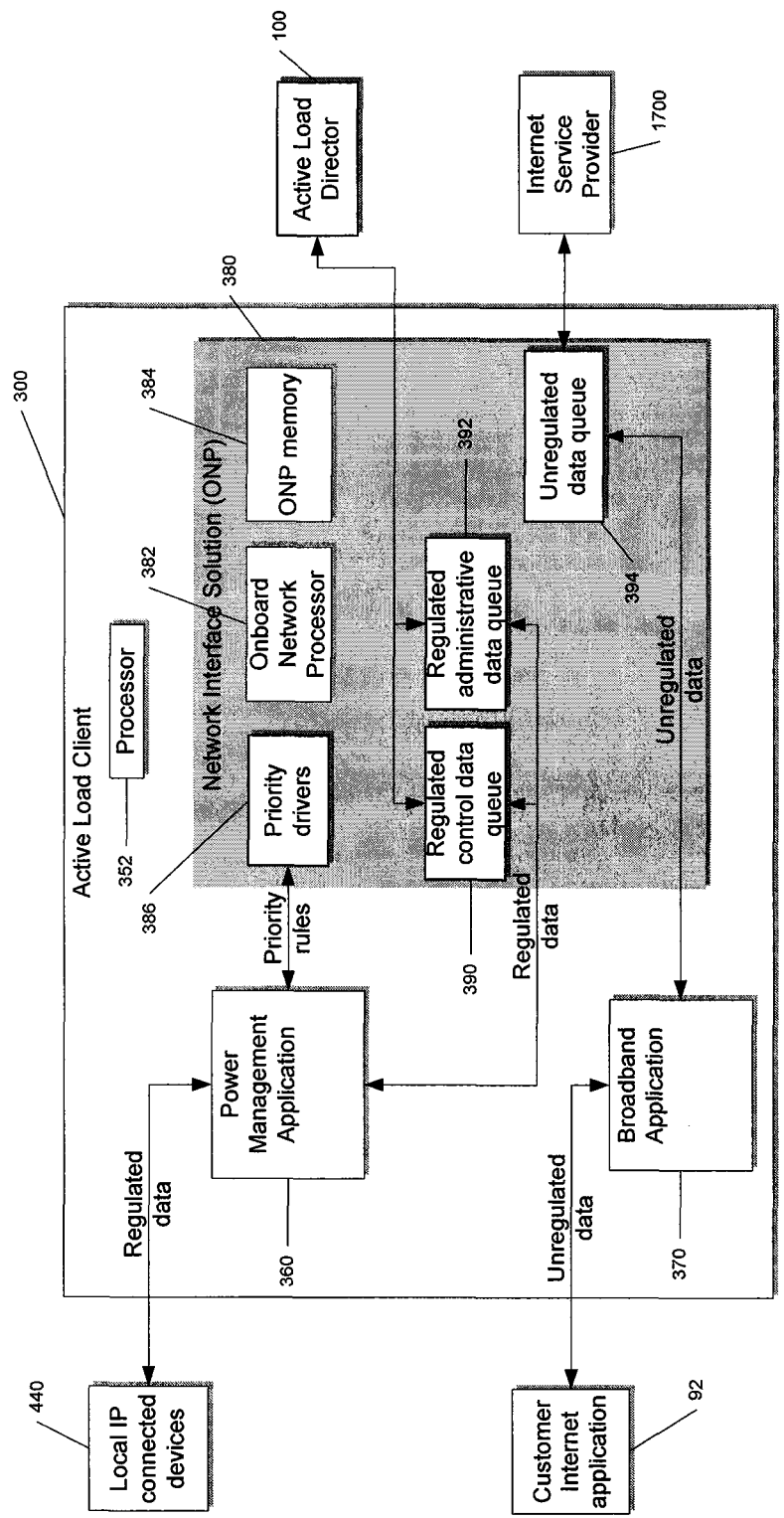
FIG. 5 is a block diagram illustrating an exemplary implementation of the Network Interface Solution as a hardware solution.

FIG. 5 depicts a hardware implementation approach for the Network Interface Solution 380. The hardware implementation uses a gateway with the addition of an onboard network processor. As illustrated, the ALC 300 includes an Onboard Network Processor (ONP) 382 with dedicated memory 384 and priority drivers 386. The ONP 382 does all processing and manages all data queues. The priority drivers 386 carry out all of the processing and priority handling of data queues. Regulated data flowing into the Power Management Application 360 uses the priority drivers 386 to separate the regulated data into the Regulated Control Data Queue 390 and the Regulated Administrative Data Queue 392. The ONP 382 sends the data from these queues to the Active Load Director 100 using priority rules described previously. Similarly, unregulated data flowing into the broadband application 370 goes into the Unregulated Data Queue 394 in the Network Interface Solution 380 and then to the Internet Service Provider 1700. All data packets are processed sequentially according to the data priority rules. However, priorities could be changed by the Power Management Application 360.

Figure 6:
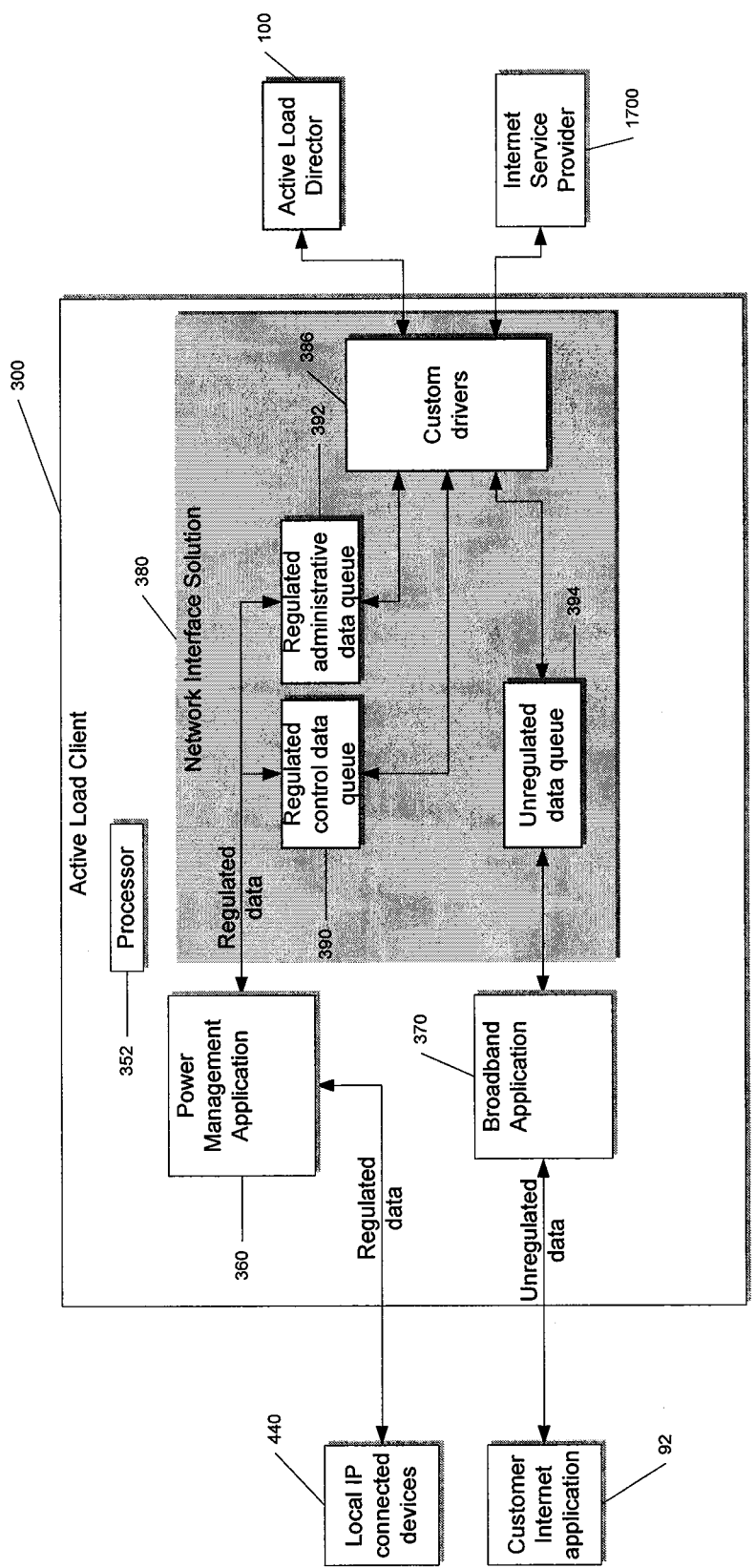
FIG. 6 is a block diagram illustrating an exemplary implementation of the Network Interface Solution as a custom drivers software solution.

FIG. 6 depicts the custom drivers software approach for the Network Interface Solution 380. This is similar to the hardware approach, but uses custom drivers software 386 to process all data packets and manage the data queues. Special buffer mirroring and queuing techniques are used to accommodate for the lack of dedicated memory available in the hardware implementation. The driver stack can be embedded into one instance of a custom Linux kernel. In an exemplary embodiment, the inbound and outbound data algorithms are different. The inbound algorithm can use the port for IPv4 traffic and/or a priority bit in the packet header for IPv6 traffic to indicate priority. The outbound algorithm uses the source of the data, either from application devices or from the ISP customer. There is a per packet overhead using this approach since the packet accounting data structures must be maintained in the custom drivers, e.g., processed, received, etc. Input and output of data packets is described in more detail in conjunction with FIGS. 9-10.

Figure 7:
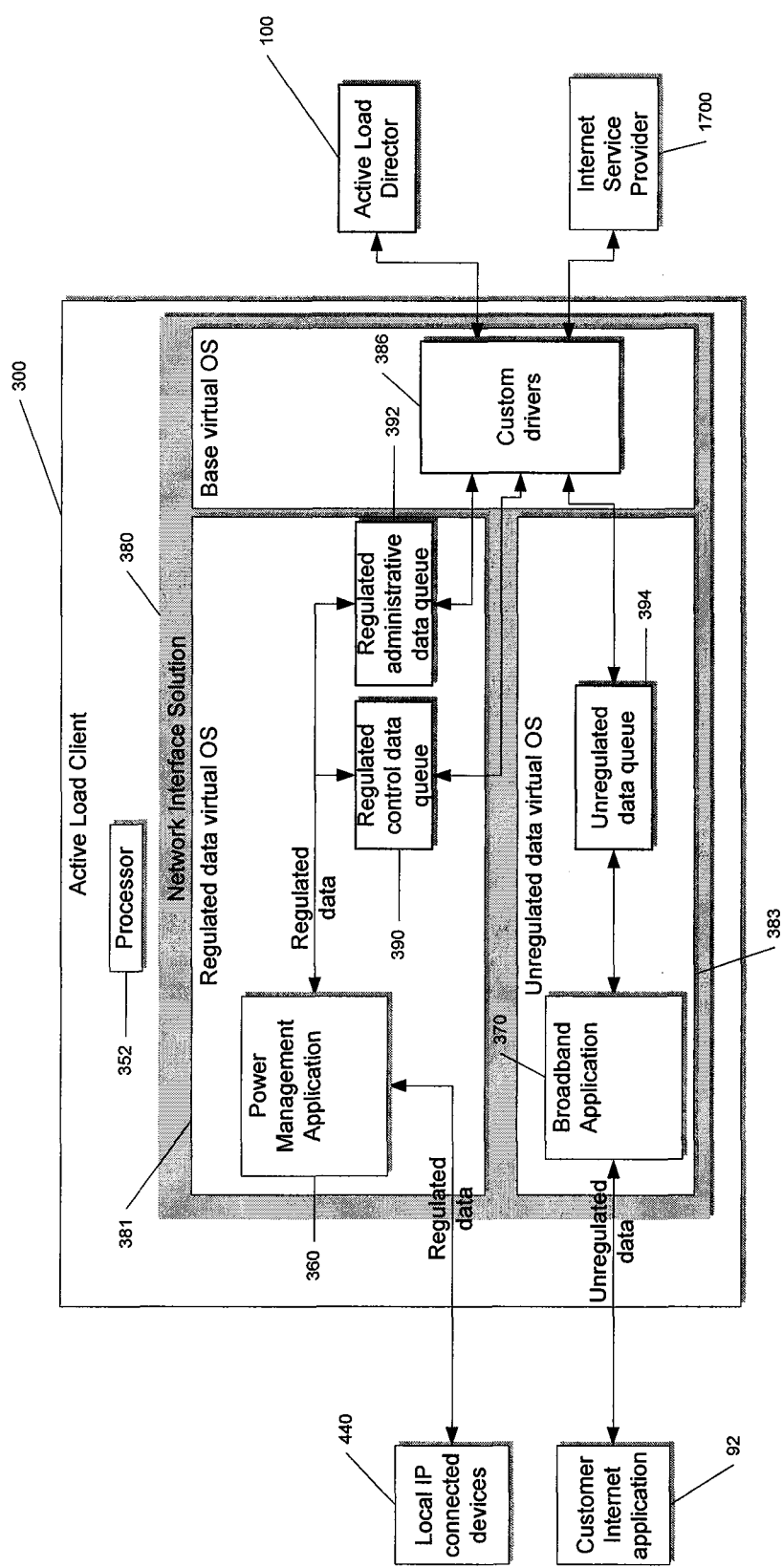
FIG. 7 is a block diagram illustrating implementation of the Network Interface Solution as a virtualization software solution.

FIG. 7 illustrates the implementation of the Network Interface Solution 380 using the virtualization software approach. In this implementation, two virtual instances of an operating system run on a base operating system. The Network Interface Solution 380 can use a base virtual operating system such as Linux. Using two virtual instances of Linux provides a way to partition resources that drives traffic prioritization. The virtual instances will run the gateway power management application 360 and the broadband application 370 that communicates with the customer's Internet service provider 1700 on the one side and the customer of the ISP on the other side. Data coming to or from the Active Load Director 100 or the Internet Service Provider 1700 is processed using the priority rules into the appropriate data queues 390, 392, 394. Two virtual operating systems (virtual OS) handle the regulated and unregulated data. The Regulated Data Virtual OS 381 is responsible for the regulated data, and its separation into control and administration data. The Unregulated Data Virtual OS 383 is responsible for unregulated data. The Regulated Data Virtual OS 381 monitors the buffer for regulatory data and interrupts the Unregulated Data Virtual OS 383 as needed. In one embodiment, the two virtual instances of Linux can be generated by the use of a router operating system such as Cisco's Application Extender Platform (AXP) running Linux IOS, or Juniper Network's JUNOS.

Figure 8:
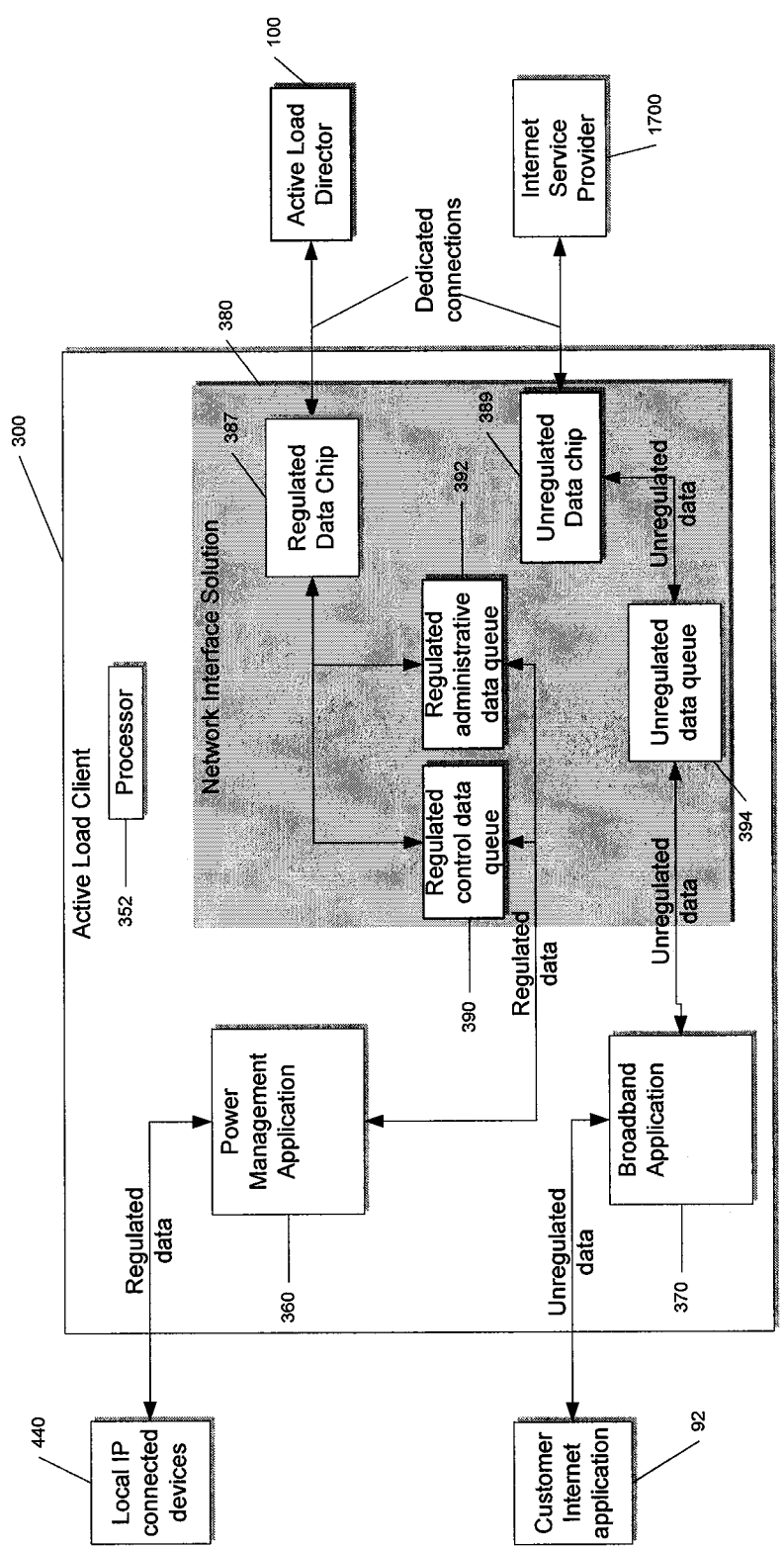
FIG. 8 is a block diagram illustrating an exemplary implementation of the Network Interface Solution as a dual-path transmission solution.

The dual-path transmission approach of the Network Interface Solution is shown in FIG. 8. This implementation provides the dual option of transmitting over wireless broadband and/or Broadband over Power Lines (BPL) using a communications protocol such as High Speed Packet Access (HSPA) protocols, or any of the Service Point Network communications protocols, and other communications protocols including replacement protocols described in more detail below. The consumer's Internet broadband traffic is always sent over the network designated for the unregulated data. The dual-path transmission approach uses two separate front-end chips 387, 389 to send and receive data from the network with each chip having a dedicated connection. The Regulated Data Chip 387 has a dedicated wired or wireless connection with the Active Load Director 100. The Unregulated Data Chip 389 has a dedicated wireless connection with the Internet Service Provider 1700. Communication with the ALD 100 is handled using one of the following options: (1) regulated data is transmitted using wired connection only in emergencies, if the power lines are working; otherwise, all data is transmitted wirelessly; (2) regulated data is always transmitted over a wired connection and unregulated data is always transmitted using a wireless connection, even in an emergency; or (3) regulated data is transmitted during an emergency using either a wireless (preferred) or a wired connection, depending on which is operational at the time.

Figure 9:
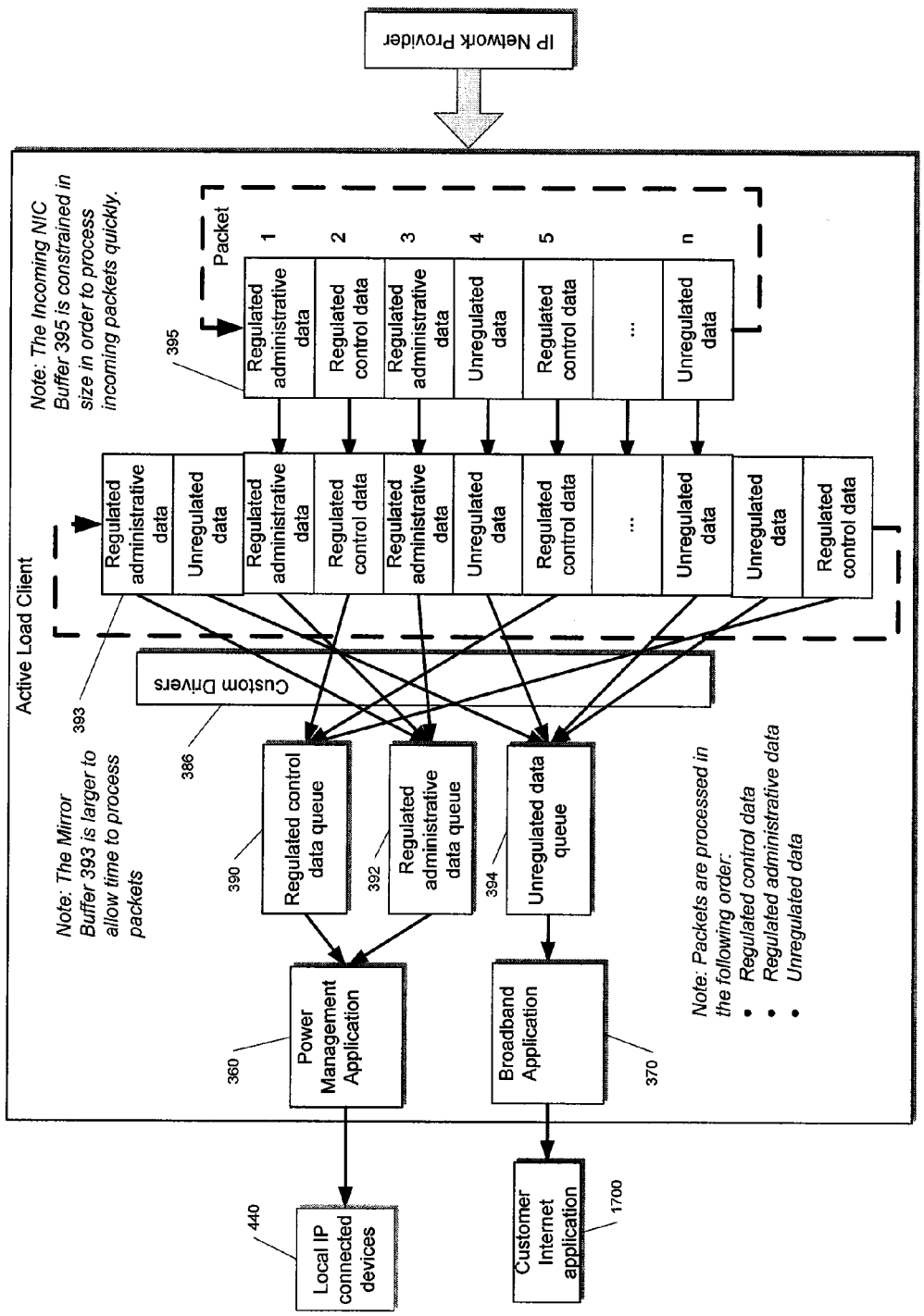
FIG. 9 is a block diagram illustrating exemplary processing of data inbound to the service point.
Figure 10:
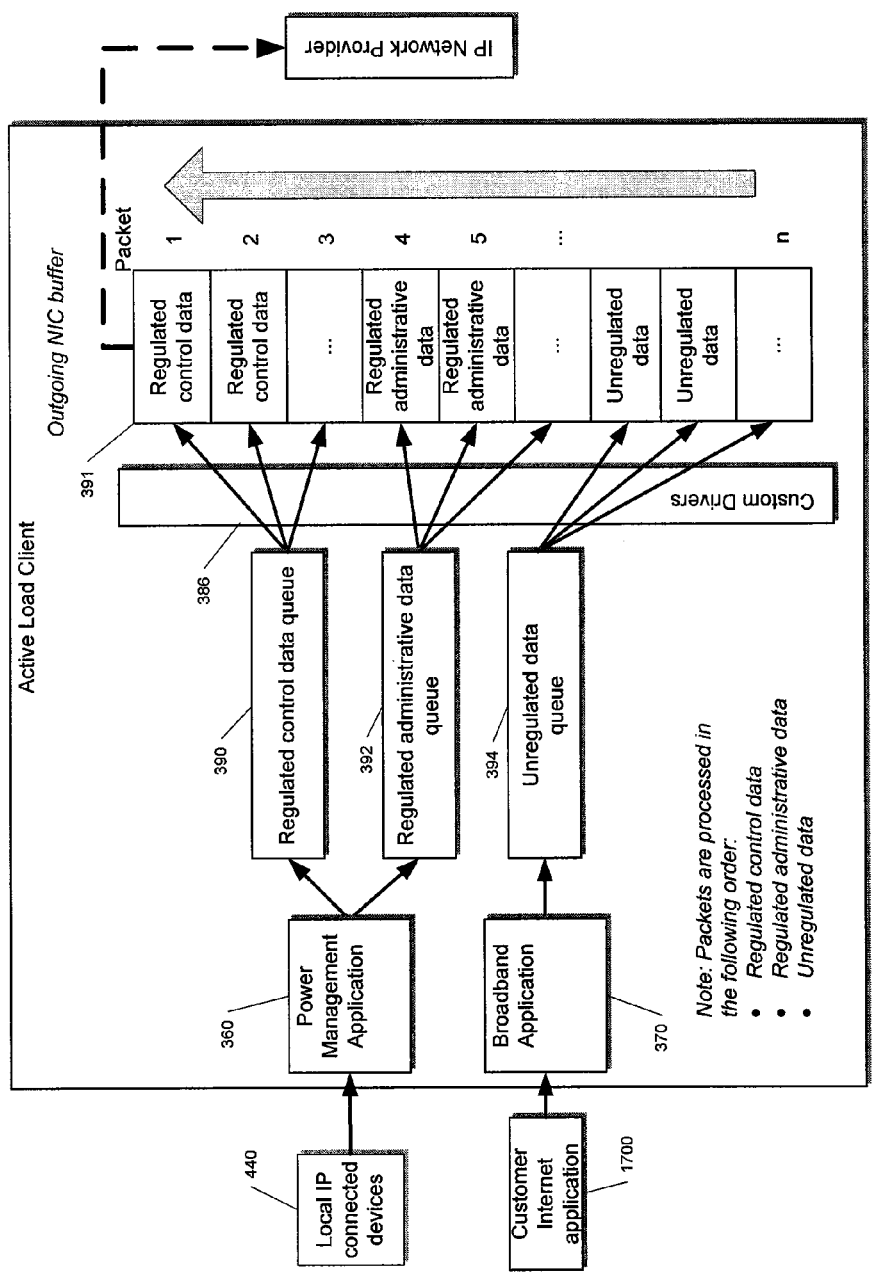
FIG. 10 is a block diagram illustrating exemplary processing of data outbound from the service point.

FIGS. 9-10 illustrate how inbound and outbound data packets are processed by the ALC 300. This exemplary embodiment works in conjunction with the custom drivers approach shown in FIG. 6, but other embodiments are possible. FIG. 9 shows how data coming from an IP Network Provider into the service point is processed by the ALC 300. Incoming data packets are inserted into the Incoming Network Interface Card (NIC) Buffer 395. This is a circular FIFO buffer. These data packets are immediately copied to the Mirror Buffer 393. The Mirror Buffer 393 is also a circular FIFO buffer but is larger than NIC Buffer 395 in order to allow data packets to persist longer to allow time for processing the data packets into the correct data queue. The Custom Drivers 386 move regulated control data to the Regulated Control Data Queue 390, regulated administrative data to the Regulated Administrative Data Queue 392, and unregulated data to the Unregulated Data Queue 394. The Power Management Application 360 then transmits data from the Regulated Control Data Queue 390 to local IP connected devices 440 and data from the Regulated Administrative Data Queue 392 to the same devices, in that order. The Broadband Application 370 then transmits data from the Unregulated Data Queue 394 to the customer Internet application 62.

In FIG. 10, data is outbound from the service point to the IP network provider. Regulated data from the local IP connected devices 440 flows into the Power Management Application 360. The Power Management Application 360 places regulated control data into the Regulated Control Data Queue 390 and regulated administrative data into the Regulated Administrative Data Queue 392. All other data is unregulated data and is placed into the Unregulated Data Queue 394 by the Broadband Application 370. The Custom Drivers 386 move the data packets into the appropriate places in the Outgoing NIC Buffer 391. All regulated control data is placed at the top of the buffer so it can be output first. Regulated administrative data is placed next in the Outgoing NIC Buffer 391, and unregulated data is placed last in the Outgoing NIC buffer 391. Packets are then output to the IP Network Provider sequentially in that order.

As described above, the embodiments encompass a method for priority delivery of load management messages on IP-based networks. This allows the embodiments to be used not just for load control of devices within the service point, but also allows the embodiments to be used as a vehicle for general Internet service to the utility customer.

In another embodiment, ALMS communication is implemented without using the IP protocol. This could involve approaches such as the following: (1) setting a part of the packet header as a flag indicating whether or not the data is priority, and (2) designating an initial segment of the data field to act as a flag indicating priority of the data packet. Thus, in this manner, the priority delivery of ALMS regulated data may be implemented in a non-IP scheme.

The embodiments may incorporate the use of various analog, digital, or spread spectrum modulation techniques as part of the implementation. This may include, but is not limited to, the following: (1) amplitude modulation (e.g., double sideband modulation, single sideband modulation, vestigial sideband modulation, quadrature amplitude modulation); (2) angle modulation (e.g., frequency modulation, phase modulation); (3) phase-shift keying; (4) frequency-shift keying; (5) amplitude-shift keying; (6) on-off keying; (7) continuous phase modulation; (8) orthogonal frequency division multiplexing modulation; (9) wavelet modulation; and (10) trellis coded modulation.

It should be noted that many terms and acronyms are used in this description that are well-defined in the telecommunications and computer networking industries and are well understood by persons skilled in these arts. Complete descriptions of these terms and acronyms, whether defining a telecommunications standard or protocol, can be found in readily available telecommunications standards and literature and are not described in any detail herein.

As used in the foregoing description, the term "ZigBee" refers to any wireless communications protocol adopted by the Institute of Electrical and Electronics Engineers (IEEE) according to standard 802.15.4 or any successor standard(s), and the term "Bluetooth" refers to any short-range communications protocol implementing IEEE standard 802.15.1 or any successor standard(s). The term "Service Point Network" or "SPN" is meant to represent any technology that allows wireless or wired devices to communicate over short distances within or around a service point, using power line communications, Ethernet, ultra wideband (UWB), or IEEE 802.15.4 technology (such as Zigbee, 6LoWPAN, or Z-Wave technology). Power line communications includes any system communicating data using power lines. The term "High Speed Packet Data Access (HSPA)" refers to any communications protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communications protocol based on 3GPP Release 8 (from the ITU) or another mobile telecommunications standards body referring to the evolution of GSM-based networks to voice, video and data standards anticipated to be replacement protocols for HSPA and EVDO. The term "Code Division Multiple Access (CDMA) Evolution Date-Optimized (EVDO) Revision A (CDMA EVDO Rev. A)" refers to the communications protocol adopted by the ITU under standard number TIA-856 Rev. A.

It will be appreciated that embodiments or components of the systems described herein may be comprised of one or more conventional processors and unique stored program instructions that control the one or more processors to implement, in conjunction with certain non-processor circuits, some, most, or all of the functions for managing power load distribution and tracking individual subscriber power consumption and savings in one or more power load management systems. The non-processor circuits may include, but are not limited to, radio receivers, radio transmitters, antennas, modems, signal drivers, clock circuits, power source circuits, relays, meters, smart breakers, current sensors, and user input devices. As such, these functions may be interpreted as steps of a method to distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein.

Furthermore, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

In the foregoing specification, the invention has been described with reference to specific embodiments. For example, the Network Interface Solution may be implemented using any of four approaches described above as well as other approaches not documented. Additionally, the functions of specific modules within the active load director server 100 and/or active load client 300 may be performed by one or more equivalent means.

The corresponding structures, materials, acts, and equivalents of any means plus function elements in the claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

What is claimed is:

1. A method for priority delivery of messages on a communications network between a server in communication with an electric utility and a client device at a service point, comprising the steps of:
   receiving a plurality of regulated data messages for electric utility priority load management, and a plurality of unregulated data messages at a bidirectional gateway in the client device;
   separating the plurality of regulated data messages for electric utility priority load management, and the plurality of unregulated data messages at the bidirectional gateway into a plurality of data queues based on a priority assigned to and associated with each data message;
   processing the plurality of regulated data messages for electric utility priority load management, at the bidirectional gateway in a plurality of regulated data queues and routing the plurality of regulated data messages for electric utility priority load management to a regulated data message destination device; and
   processing the plurality of unregulated data messages at the bidirectional gateway in a plurality of unregulated data queues and routing the plurality of unregulated data messages to an unregulated data message destination device following the routing of all messages in the plurality of regulated data queues.

2. The method for priority delivery of messages of claim 1 wherein the plurality of regulated data messages for electric utility priority load management comprises a plurality of control data messages and a plurality of administrative data messages.

3. The method for priority delivery of messages of claim 2 further comprising separating the plurality of control data messages into a regulated control data queue of the plurality of regulated data queues and separating the plurality of administrative data messages into a regulated administrative data queue of the plurality of regulated data queues.

4. The method for priority delivery of messages of claim 3 further comprising processing and routing the plurality of control data messages before the plurality of administrative data messages.

5. The method for priority delivery of messages of claim 4 further comprising initiating a control event within at least one controllable, power-consuming device at the service point in response to a control data message originating from the server.

6. The method for priority delivery of messages of claim 4 further comprising monitoring and reporting a status of at least one controllable, power-consuming device at the service point in response to an administrative data message originating from the server.

7. The method for priority delivery of messages of claim 4 further comprising communicating the plurality of control data messages between a power management application in the client device and a plurality of Internet Protocol (IP) connected devices at the service point.

8. The method for priority delivery of messages of claim 1 further comprising communicating the plurality of unregulated data messages between a broadband application in the client device and an Internet application at the service point.

9. The method for priority delivery of messages of claim 1 further comprising communicating the plurality of regulated data messages for electric utility priority load management between a network interface at the gateway and the server for transmission to the electric utility.

10. The method for priority delivery of messages of claim 1 further comprising communicating the plurality of unregulated data messages between a network interface at the gateway and an Internet service provider.

11. The method for priority delivery of messages of claim 1 further comprising separating the plurality of regulated data messages for electric utility priority load management and the plurality of unregulated data messages at the bidirectional gateway by a network interface component.

12. The method for priority delivery of messages of claim 1 further comprising processing the plurality of regulated data queues and the plurality of unregulated data queues by both priority and a first-in, first-out sequence.

13. A system for priority delivery of messages on a communications network between a server in communication with an electric utility and a plurality of Internet Protocol (IP) connected devices at a service point, comprising:
   a network interface component including a plurality of data queues arranged based on a priority associated with each type of data message;
   a processor configured for priority delivery of data messages by:
      receiving a plurality of regulated data messages for electric utility priority load management, and a plurality of unregulated data messages;
      separating the plurality of regulated data messages for electric utility priority load management, and the plurality of unregulated data messages, into the plurality of data queues based on the priority assigned to and associated with each data message;
      processing the plurality of regulated data messages for electric utility priority load management, in a plurality of regulated data queues of the plurality of data queues and routing the plurality of regulated data messages for electric utility priority load management to a regulated data message destination device; and
      processing the plurality of unregulated data messages in a plurality of unregulated data queues of the plurality of data queues and routing the plurality of unregulated data messages to an unregulated data message destination device following the routing of all messages in the plurality of regulated data queues.

14. The system for priority delivery of messages of claim 13 wherein the plurality of regulated data messages for electric utility priority load management include a plurality of control data messages and a plurality of administrative data messages, the processor being further configured for separating the plurality of control data messages into a regulated control data queue of the plurality of regulated data queues and separating the plurality of administrative data messages into a regulated administrative data queue of the plurality of regulated data queues.

15. The system for priority delivery of messages of claim 14 wherein the processor is further configured for processing and routing the plurality of control data messages before the plurality of administrative data messages.

16. The system for priority delivery of messages of claim 14 wherein the processor is further configured for initiating a control event within at least one controllable, power-consuming device at the service point in response to a control data message received from the server.

17. The system for priority delivery of messages of claim 14 wherein the processor is further configured for monitoring and reporting a status of at least one controllable, power-consuming device at the service point in response to an administrative data message received from the server.

18. The system for priority delivery of messages of claim 14 further comprising a power management application operable on the processor for communicating the plurality of control data messages from the server to the plurality of IP connected devices at the service point.

19. The system for priority delivery of messages of claim 13 further comprising a broadband application operable on the processor for communicating the plurality of unregulated data messages between an Internet application at the service point and an Internet service provider.

20. The system for priority delivery of messages of claim 13 wherein the network interface component is further operable to communicate the plurality of regulated data messages between the service point and the server for transmission to the electric utility.

21. The system for priority delivery of messages of claim 13 wherein the network interface component is further operable to communicate the plurality of unregulated data messages between the service point and an Internet service provider.

22. The system for priority delivery of messages of claim 13 wherein the processor is further configured for processing the plurality of regulated data queues and the plurality of unregulated data queues by both priority and a first-in, first-out sequence.

23. The system for priority delivery of messages of claim 13 wherein the network interface component comprises a memory for implementing the plurality of data queues and a plurality of priority drivers, responsive to the processor, for processing and handling the plurality of data queues based on priority.

24. The system for priority delivery of messages of claim 13 wherein the network interface component comprises a plurality of custom drivers, responsive to the processor, for processing the plurality of regulated data messages for electric utility priority load management and the plurality of unregulated data messages and managing the plurality of data queues.

25. The system for priority delivery of messages of claim 21 wherein the plurality of custom drivers are embedded in a Linux kernel instance.

26. The system for priority delivery of messages of claim 24 further comprising an inbound buffer for receiving regulated data messages for electric utility priority load management and unregulated data messages from an IP network provider and an outbound buffer for transmitting regulated data messages for electric utility priority load management and unregulated data messages to the IP network provider.

27. The system for priority delivery of messages of claim 26 further comprising a mirror inbound buffer for copying regulated data messages for electric utility priority load management and unregulated data messages received from the IP network provider from the inbound buffer and wherein the plurality of custom drivers separates and moves the copied data messages to the plurality of data queues.

28. The system for priority delivery of messages of claim 26 wherein the plurality of custom drivers moves regulated data messages for electric utility priority load management and unregulated data messages from the plurality of data queues to the outbound buffer for transmission to the IP network provider.

29. The system for priority delivery of messages of claim 13 wherein the network interface component comprises a regulated data virtual operating system that monitors a buffer for regulated data, separates the regulated data into control data messages and administrative data messages, and provides the regulated data messages for electric utility priority load management to a power management application; and an unregulated data virtual operating system for monitoring unregulated data messages and providing unregulated data messages to a broadband application.

30. The system for priority delivery of messages of claim 29 wherein the network interface component further comprises a router operating system for generating the regulated data virtual operating system and the unregulated data virtual operating system.

31. The system for priority delivery of messages of claim 13 wherein the network interface component further comprises a regulated data chip having a dedicated connection to the server; and an unregulated data chip having a dedicated connection to an Internet service provider, the regulated data chip and the unregulated data chips providing a dual path transmission option of transmitting over wireless broadband or a wired connection.

32. The system for priority delivery of messages of claim 31 wherein the dual path transmission option facilitates wireless broadband transmission of both regulated data messages for electric utility priority load management using the regulated data chip and unregulated data messages using the unregulated data chip.

33. The system for priority delivery of messages of claim 32 wherein the dual path transmission option facilitates emergency transmission of regulated data messages for electric utility priority load management via a wired connection using the regulated data chip.

34. The system for priority delivery of messages of claim 32 wherein the dual path transmission option facilitates emergency transmission of regulated data messages for electric utility priority load management via a wireless connection using the regulated data chip.

35. The system for priority delivery of messages of claim 31 wherein the dual path transmission option facilitates transmission of regulated data messages for electric utility priority load management over a wired connection using the regulated data chip and facilitates transmission of unregulated data messages over wireless broadband using the unregulated data chip.

36. The system for priority delivery of messages of claim 31 wherein a communications protocol for the wireless broadband comprises any one of High Speed Packet Access (HSPA), Long Term Evolution (LTE), Code Division Multiple Access Evolution-Data-Optimized (CDMA EVDO), ZigBee, ultra wideband, Z-Wave, and 6LoWPAN.

37. The system for priority delivery of messages of claim 31 wherein a communications protocol for the wired connection comprises Broadband over Power Lines.

38. The system for priority delivery of messages of claim 13 wherein the priority associated with each type of data message is determined by setting a bit in a header of each regulated data message for electric utility priority load management and each unregulated data message.

39. The system for priority delivery of messages of claim 13 wherein the priority associated with each type of data message is determined based on an originating source of each regulated data message for electric utility priority load management and each unregulated data message.

* * * * *